(12) United States Patent
Gekht et al.

(10) Patent No.: US 9,388,741 B2
(45) Date of Patent: Jul. 12, 2016

(54) RECUPERATOR FOR GAS TURBINE ENGINE

(71) Applicant: PRATT & WHITNEY CANADA CORP., Longueuil (CA)

(72) Inventors: Eugene Gekht, Brossard (CA); André Julien, Ste. Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 663 days.

(21) Appl. No.: 13/664,579

(22) Filed: Oct. 31, 2012

(65) Prior Publication Data

US 2015/0192069 A1 Jul. 9, 2015

(51) Int. Cl.
*F02C 7/10* (2006.01)
*F28D 9/04* (2006.01)
*F28D 21/00* (2006.01)

(52) U.S. Cl.
CPC ... *F02C 7/10* (2013.01); *F28D 9/04* (2013.01); *F28D 21/001* (2013.01); *F05D 2220/32* (2013.01); *F05D 2260/221* (2013.01); *Y02T 50/671* (2013.01)

(58) Field of Classification Search
CPC .......... F02C 7/08; F02C 7/10; F28D 21/0003; F28D 9/04; F28D 9/0012; F28D 9/0018; F28D 2001/0273
USPC .......... 60/39.511, 266, 782, 39.5, 799; 165/4, 165/10, 125, 165, 166
See application file for complete search history.

(56) References Cited

U.S. PATENT DOCUMENTS

| | | | | |
|---|---|---|---|---|
| 2,657,018 A * | 10/1953 | Simpelaar | ...................... | 165/103 |
| 3,054,257 A * | 9/1962 | Schelp | ......................... | 60/39.17 |
| 3,507,115 A * | 4/1970 | Wisoka | ...................... | 60/39.511 |
| 3,701,381 A * | 10/1972 | Watts | ............................... | 165/82 |
| 3,782,457 A * | 1/1974 | Troy | ............................... | 165/165 |
| 4,506,502 A | 3/1985 | Shapiro | | |
| 5,253,472 A | 10/1993 | Dev | | |
| 6,092,361 A | 7/2000 | Romani | | |
| 6,711,889 B2 | 3/2004 | Kuo et al. | | |
| 7,775,031 B2 | 8/2010 | Wood | | |
| 2002/0124569 A1 * | 9/2002 | Treece et al. | ................... | 60/772 |

* cited by examiner

*Primary Examiner* — Steven Sutherland
(74) *Attorney, Agent, or Firm* — Norton Rose Fulbright Canada LLP (57) ABSTRACT

A recuperator inserted in the exhaust duct of a gas turbine engine includes a casing surrounding a core having spiral cross channels. Inlet and outlet openings are defined in the casing for the passage of hot exhaust gases through the exhaust channels in the core. Feeder members extend radially across the outlet opening for passing the pre-combustion stage air through the air channels of the core, and header members extend radially across the inlet opening of the casing for receiving and redirecting air from the air channels in the core towards the combustor section. The feeder and header members each have a tapered configuration from the casing to the axial center of the casing so as to maintain a relatively constant pressure over the radial extent of the respective feeders and headers.

12 Claims, 7 Drawing Sheets

RECUPERATOR FOR GAS TURBINE ENGINE

TECHNICAL FIELD

The present invention relates to gas turbine engines and more particularly to improvements in recuperators suitable for such engines.

BACKGROUND

Use of a recuperator, while improving efficiency of a gas turbine engine, can also have a number of disadvantages. One such potential disadvantage is the reduction of power of a turbine engine that includes a recuperator. As may be appreciated, passing compressed air from the compressor and also the exhaust gas through the ducting associated with a recuperator, results in a pressure drop of the compressed air and exhaust gas thereby reducing the high-end performance (e.g., maximum power) of the engine. Such reduced power output is especially disadvantageous in aircraft and helicopter applications where maximum power is often desired and/or necessary during takeoff or hot and high altitude flying.

Another potential disadvantage is the increased weight and encumbrance of a turbine engine incorporating a recuperator. Such a disadvantage is also evident in aircraft applications where turbine engines are often utilized due to their high power to weight ratio. This limits the practical size of the recuperator that can be used and therefore reduces the efficiency gains that can be achieved. Practical ways of incorporating a recuperator in an aircraft engine, such as a PT6 model engine for example, are therefore sought while minimizing such disadvantages.

SUMMARY

There is provided a gas turbine engine having a compressor section, a combustor section and a turbine section with a gas exhaust duct downstream of the turbine section, the gas turbine engine further comprising a recuperator disposed in the gas exhaust duct, the recuperator including a casing of circular cross-section surrounding at least a core having spiral cross channels including pre-combustion stage air channels and exhaust channels for directing hot gases from the turbine section into heat exchange relationship with pre-combustion stage air passing through respective cross channels, and inlet and outlet openings defined in the casing for the passage of said hot exhaust gases through the exhaust channels in the core, feeder members extending radially across the outlet opening for passing the pre-combustion stage air through the air channels of the core, and header members extending radially across the inlet opening of the casing for receiving and redirecting air from the air channels in the core towards the combustor section, the feeder and header members each having a tapered configuration from the casing to the axial center of the casing so as to maintain a relatively constant pressure over the radial extent of the respective feeders and headers.

There is also provided a recuperator to be located in the exhaust duct of a gas turbine engine having a compressor section, a combustor section and a turbine section with a gas exhaust duct downstream of the turbine section, the recuperator comprising: a casing containing at least a core made up of spiral cross channels for the passage of hot gases from the turbine section in heat exchange relationship with pre-combustion stage air, and inlet and outlet openings defined in the casing for the passage of hot exhaust gases through the exhaust gas channels in the core; the casing defined by a thin wall interrupted by a an expansion portion of the thin wall, allowing the thin wall to expand or contract in response to at least one of thermal stresses and vibrations.

There is further provided a recuperator to be located in the exhaust duct of a gas turbine engine having a compressor section, a combustor section and a turbine section with a gas exhaust duct downstream of the turbine section, the recuperator comprising: a casing of circular cross-section containing at least a core made up of spiral cross channels for the passage of hot gases from the turbine section in heat exchange relationship with pre-combustion stage air, and inlet and outlet openings defined in the casing for the passage of hot exhaust gases through the exhaust gas channels in the core; the casing is defined by a thin wall interrupted by a an expansion portion of the thin wall, allowing the thin wall to expand or contract in response to at least one of thermal stresses and vibrations; feeder members extending radially across the outlet opening for passing the air through the air channels of the core; header members extending radially across the inlet opening of the casing for receiving and redirecting air from the air channels in the core towards the combustor section; the feeder and header members each having an inverse tapered configuration relative to the axial center of the casing so as to maintain a relatively constant pressure over the radial extent of the respective feeders and headers.

In another aspect, the recuperator includes a casing which includes expansion portions to accommodate thermal stresses in the casing. In one embodiment these expansion portions are in the form of bellows.

BRIEF DESCRIPTION OF THE DRAWINGS

Reference is now made to the accompanying Figs. in which.

DESCRIPTION OF THE PREFERRED EMBODIMENTS

Figure 1:
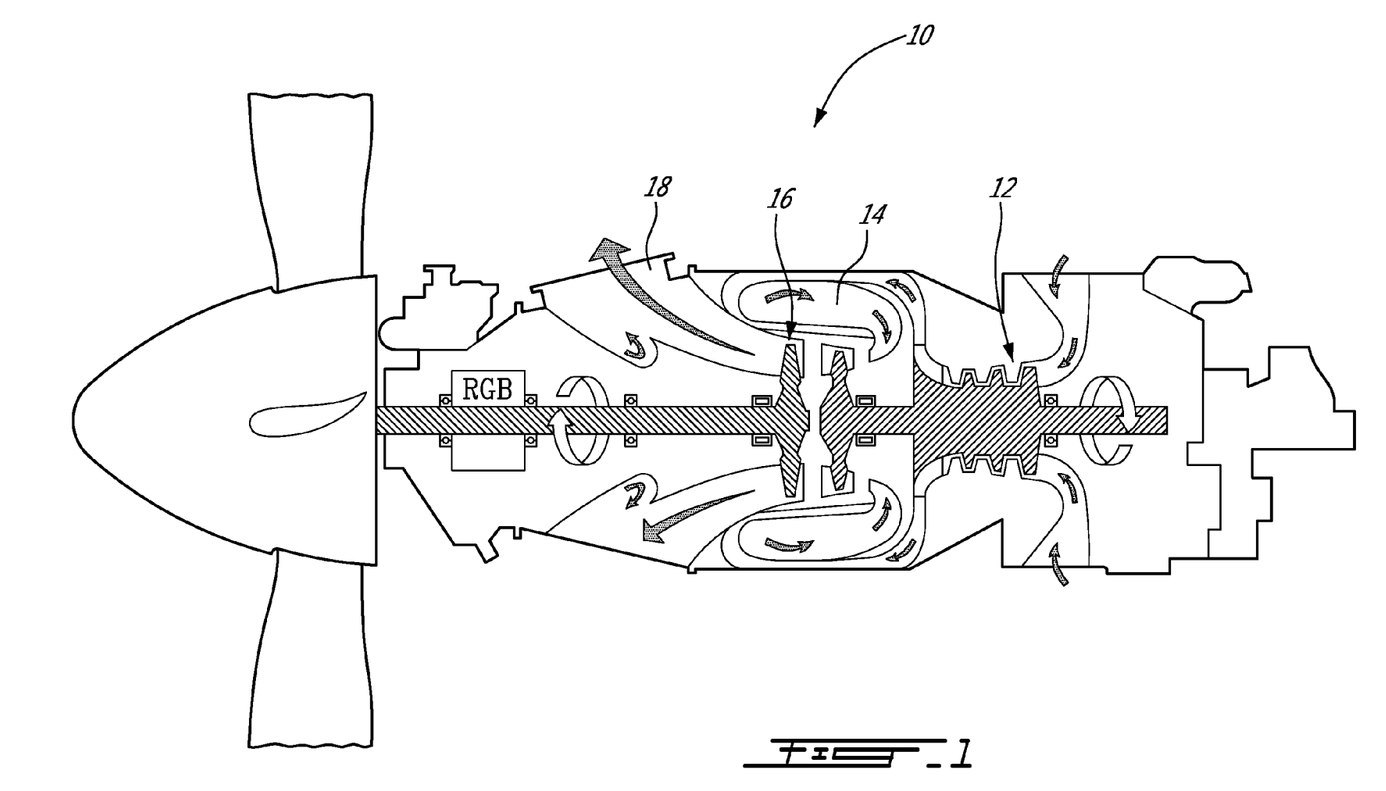
FIG. 1 is a schematic cross-sectional view of a gas turbine engine.

FIG. 1 schematically depicts a gas turbine engine 10 which, as an example, illustrates the application of the described subject matter. The gas turbine engine 10 includes a high pressure compressor 12, a combustor section 14 and a turbine section 16 with one or more lateral or radial exhaust ducts 18a, b . . . n.

Figure 2:
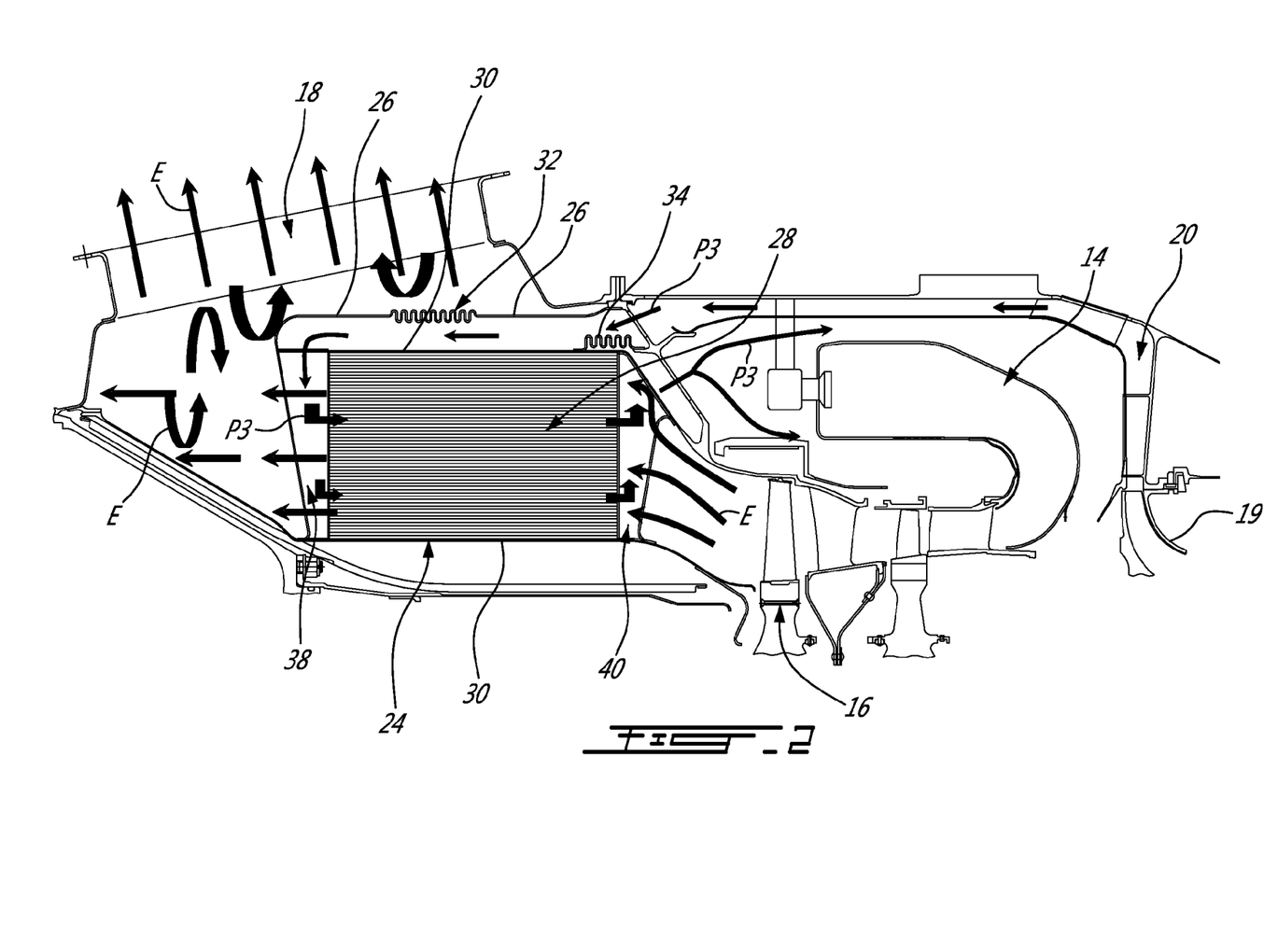
FIG. 2 is a schematic axial cross-sectional view showing a detail of a preferred embodiment.

As shown in FIGS. 1 and 2, the engine 10 is, for example, a PT 6 engine developed and sold by Pratt & Whitney Canada since the early 60s. The engine 10 includes an impeller 19 downstream but integral with the compressor 12 and communicating with a centrifugal diffuser 20. The compressed air known as P3 air is diverted to a recuperator 24 located, as will be described further, in the exhaust duct 18a, downstream of the turbine section 16. Since the exhaust duct 18a extends in a radial direction in a PT6 configuration, it is adjacent the combustor section 14. The P3 air passages are therefore much more compact which renders the recuperator 24 practical, in this environment, as the P3 air path is not unduly lengthy.

The recuperator 24 has a core 28 made up of spiral wafer thin metal foils defining cross channels typical of a heat exchanger, as is well known in the art. The metal foils may have a thickness of 0.002-0.005 inches (0.0508 mm-0.127 mm). In the present embodiment, the core 28 fills a casing 30 having a circular configuration relative to the axis of the spiral core 28.

Figure 3:
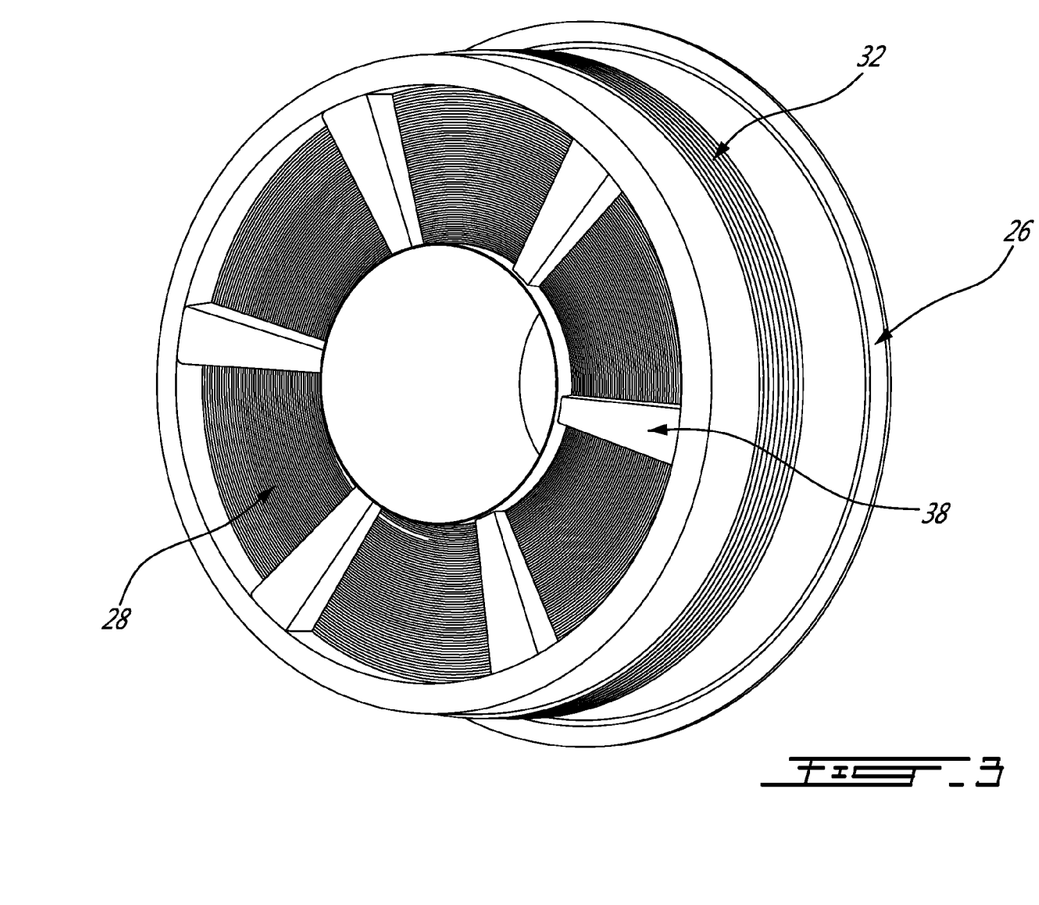
FIG. 3 is a perspective view showing a detail of the embodiment shown in FIG. 2.
Figure 4:
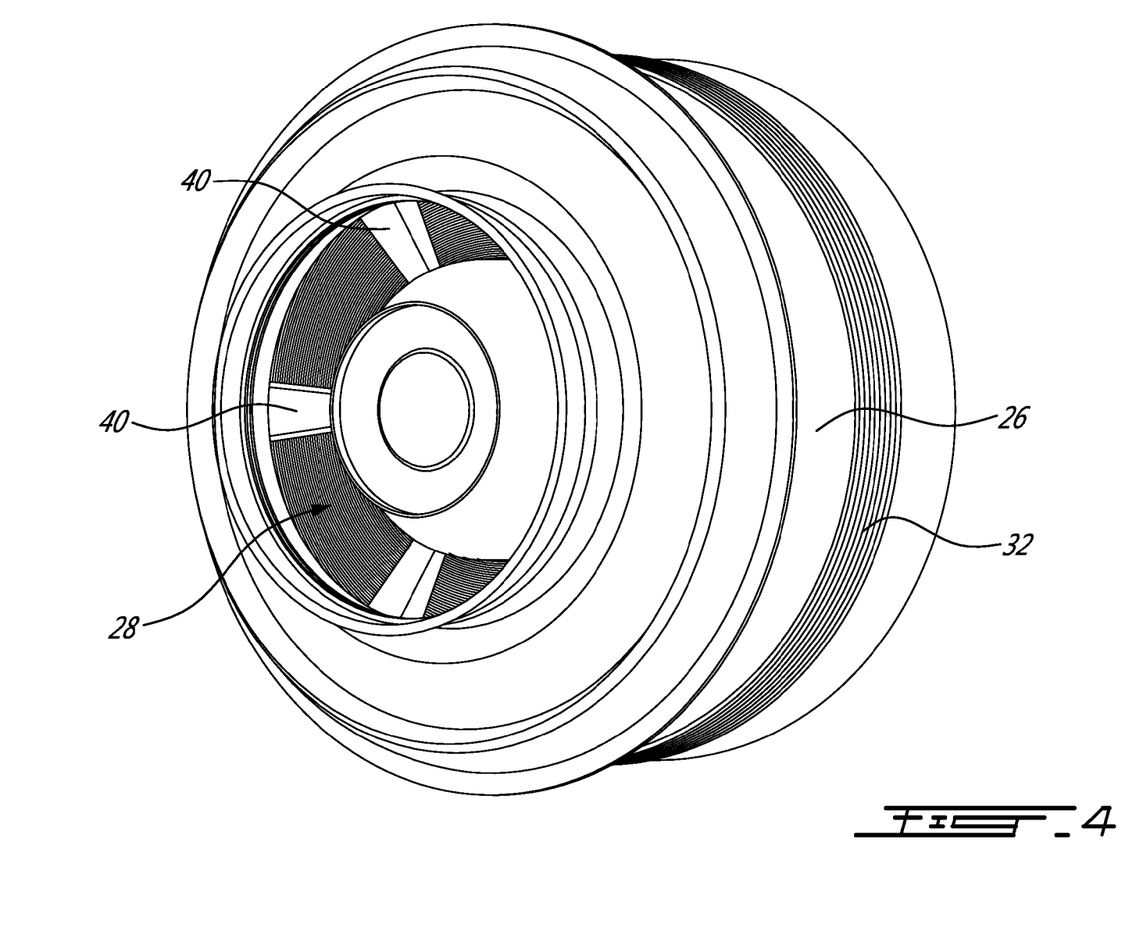
FIG. 4 is a perspective view showing the detail of FIG. 3 from a different angle.

The casing 30 is provided with a circumferential bellows section 34 in order to allow thermal expansion and contraction of the otherwise tightly designed casing 30. The bellows may have corrugations formed in the thin metal sheet of the casing 30. An outer casing 26 surrounds the casing 30, as shown in FIGS. 2, 3 and 4, and defines a passageway meant to conduct the P3 air to feeders 38 at the outlet of the core 28 relative to the direction of exhaust gases E passing through the core 28. The casing 26 is also provided with bellows 32, which are similar to the bellows 34 and are for the purpose of accommodating thermal stresses but also to reduce vibrations and friction, within the assembly.

As shown in FIGS. 2 and 3, a plurality of feeders 38 extend radially from an axial center of the core 28 to the periphery of the casing 30 (FIGS. 2 and 4), in communication with the duct formed between the casings 26 and 30. Each feeder 38 is tapered from the periphery of the casing 30 to the center of the core. The P3 air enters the feeder 38 in a radially inward direction towards the respective channels in the core 28. In the present embodiment, each of the tapered feeders 38 is in the form of a frusto-pyramid, with the base of the pyramid at the periphery of the casing 30 and in communication with the duct transporting the P3 air. Thus the cross-sectional area of the feeder 38 is continually diminishing in the radially inward direction in order to maintain consistent pressure of the P-3 air as it enters the core 28. The headers 40 are similar in configuration to the feeders 38 but are provided at the opposite end of the casing 30, that is, the intake end of the casing 30 with respect to the exhaust gases from the turbine 16. The headers 40 communicate with the combustor section 14. The P3 air, preheated as it exits the core 28, passes through the header 40 radially outwardly towards the area surrounding the combustor 14 prior to entering the combustor per se.

The recuperator 24 may be integrated in a stationary, industrial gas turbine engine where weight is not a factor. In such an environment, the recuperator 24 may be larger in the heat transfer from the peak air from the exhaust gases to the P3 air may be maximize providing ultimate fuel efficiency to the engine. However, as is well known, in a gas turbine engine for a light aircraft or helicopter, additional weight is an important factor, and thus the design of the recuperator must be such that the weight is balanced against the increase in pre-heating of the P3 air in order to maximize fuel efficiency. For a gas turbine engine designed for aircrafts, the recuperator 24 is designed with this balance in mind. The thickness of the walls of the casings 26 and 30 as well as the feeders 38 and headers 40 are in the area of approximately 39 thousands of an inch (1 mm). The thickness can vary in this zone of dimension.

Figure 5:
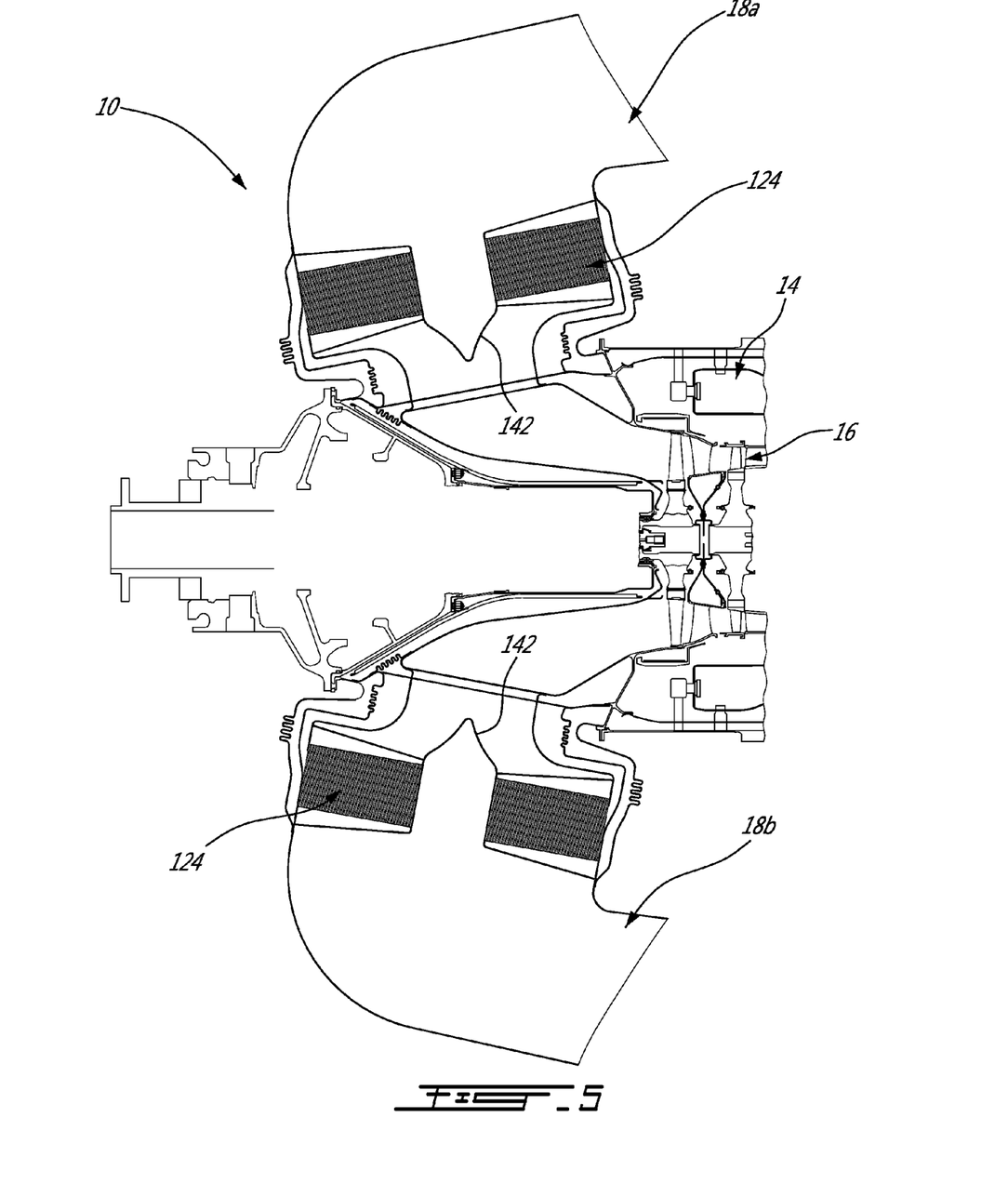
FIG. 5 is a fragmentary schematic view in axial cross section of another embodiment.
Figure 6:
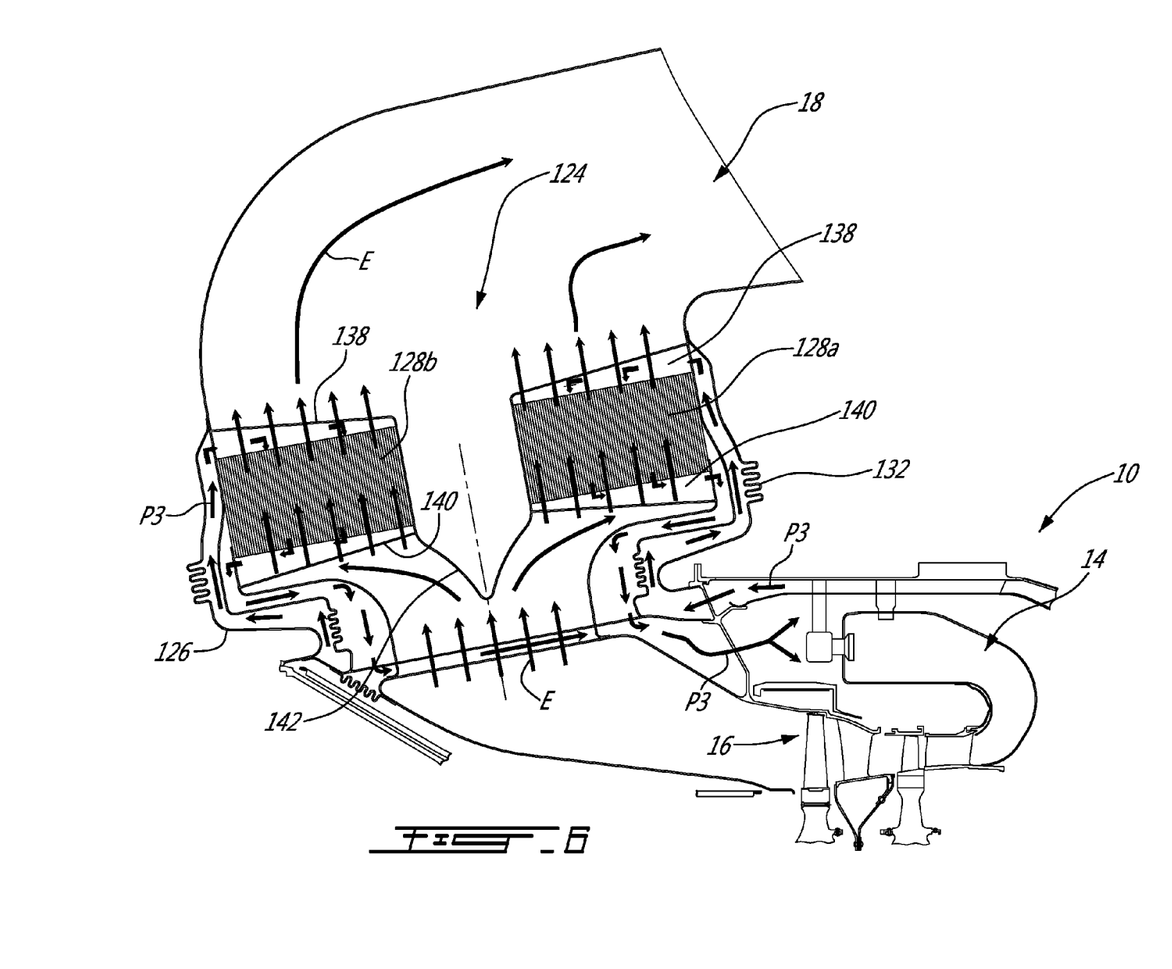
FIG. 6 is an enlarged schematic view of the detail shown in FIG. 5.
Figure 7:
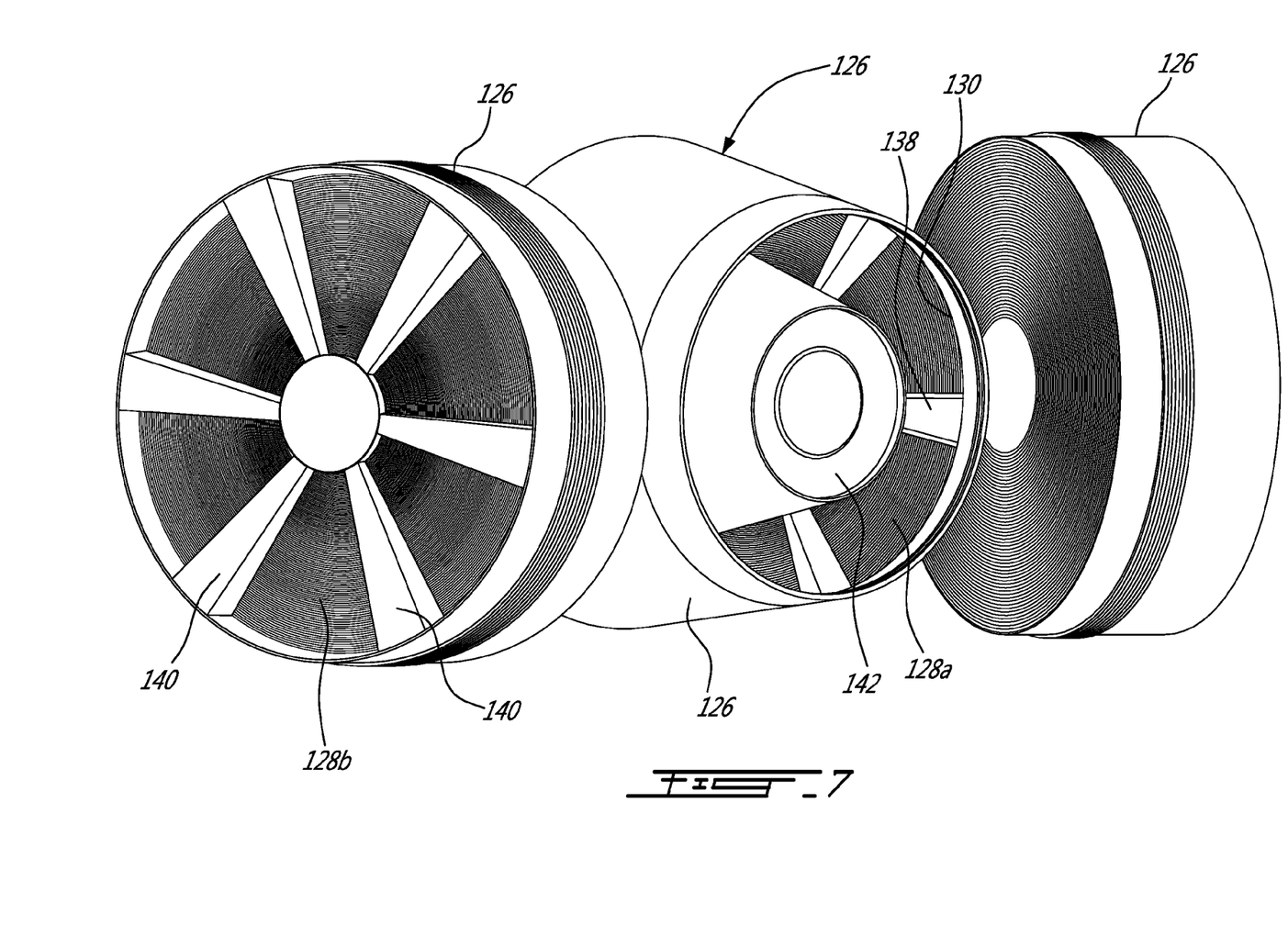
FIG. 7 is a perspective view showing a detail of the embodiment shown if FIG. 5.

FIGS. 5 through 7, illustrates another embodiment of the recuperator identified by the numeral 124. The multiple, spiral core recuperator 124, is shown with two cores 128a and 128b, in the drawings. The number of cores 128a, b . . . n might depend on the number of exhaust ducts 18a, b of the engine 10. As shown in FIG. 6, each core 128a,128b is similarly constructed to the single core embodiment shown in FIGS. 2 to 4. The numbers identifying similar components in the embodiment shown in FIGS. 6 to 7 are raised by 100 to the corresponding components in the embodiment shown in FIGS. 2 to 4.

Specifically, the recuperator 124 has a hub 142 that would separate the cores 128a, 128b. The hub splits the exhaust gases E as it discharges from the turbine section 16. The gases E are then respectively passed through cores 128a, 128b before exiting into the atmosphere. The P3 air is similarly split and distributed through respective cores 128, 128b by way of the feeders 138. The P3 air is then routed by the headers 140 to the combustor section 14.

FIG. 7 shows another embodiment of the multiple-core recuperator 224. In this embodiment the corresponding numerals have been raised by 200. For instance the recuperator 224 includes a single inlet 241 for the exhaust gases including headers 240 for the P3 air. However the recuperator 224 includes two outlet segments 243a and 243b. The inlet 241 could configured to fit within the axial extent of the exhaust duct 18 with the hub 241 accommodating the power shaft while the outlet segments 243a and 243b fit would fit within the radial exhaust outlet ports individually. More than two outlet segments may be contemplated depending on the design of the engine.

Each of the outlet segments 243a and 243b include cores 228 respectively as well as feeders 238 for the P3 air. The casing 226 is shown extending over the inlet and outlet segments. The core casing 238 would also extent over the cores 228 as described in relation to FIGS. 2 and 6.

It is understood that the features described above may be applied to any suitable recuperator presently available or hereafter invented. For instance, the bellows feature of the casings is applicable not only to the embodiments described herein, but to other configurations. Likewise the configuration of the feeders and headers could apply to other recuperator configurations.

The invention claimed is:

1. A gas turbine engine having a compressor section, a combustor section and a turbine section with a gas exhaust duct downstream of the turbine section, the gas turbine engine further comprising a recuperator disposed in the gas exhaust duct, the recuperator including a casing of circular cross-section surrounding at least a core having channels including pre-combustion stage air channels and exhaust gas channels for directing hot gases from the turbine section into heat exchange relationship with pre-combustion stage air passing through respective channels, and inlet and outlet openings defined in the casing for the passage of said hot gases through the exhaust gas channels in the core, feeder members extending radially across the outlet opening for passing the pre-combustion stage air through the air channels of the core, and header members extending radially across the inlet opening of the casing for receiving and redirecting air from the pre-combustion stage air channels in the core towards the combustor section, the feeder and header members each having a tapered configuration from the casing to the axial center of the casing so as to maintain a relatively constant pressure over the radial extent of the respective feeders and headers, wherein an outer casing surrounds the casing surrouding the core and defines air ducts in fluid communication with the compressor section and the feeder members for conducting the pre-combustin stage air to the feeder members and separate air ducts for conducting the hot air from the header memebers to the combustor section.

2. The gas turbine engine as defined in claim 1 wherein the feeder and header members have the tapered configuration of a frusto-pyramid with a base at the periphery of the casing.

3. The gas turbine engine is defined in claim 1 wherein the feeder and header members have a hollow pyramidal shape with a base of the pyramid in fluid communication with the respective air ducts formed between the core casing and the outer casing.

4. The gas turbine engine as defined in claim 1 wherein multiple cores are provided with respective casings that have respective inlets and outlets.

5. The gas turbine engine as defined in claim 1 wherein multiple cores are provided in a single casing having a unitary inlet and multiple outlets.

6. A gas turbine engine to be located in a exhaust duct of a gas turbine engine having a compressor section, a combustor section and a turbine section, with the exhaust duct downstream of the turbine section, the recuperator comprising: a casing containing at least a core made up of exhaust gas channels for the passage of hot gases from the turbine section in heat exchange relationship with pre-combustion stage air, and inlet and outlet openings defined in the casing for the passage of hot gases through the exhaust gas channels in the core; the casing defined by a thin wall interrupted by a an expansion portion of the thin wall, allowing the thin wall to expand or contract in response to at least one of thermal stresses and vibrations, wherein an outer casing surrounds and is spaced apart from the casing surrounding the core, to form air passage ducts leading to the core, the outer casing defined by a thin wall interrupted by an expansion portion of the thin wall, allowing the thin wall to expand and contract in response to at least one of thermal stresses and vibrations.

7. The recuperator as defined in claim 6 wherein the expansion portion is in the form of corrugations in the thin wall forming bellows.

8. The recuperator is defined in claim 6 wherein the casing has a circular cross-section and the expansion portion is a circumferential band.

9. The recuperator as defined in claim 6 wherein multiple cores are provided in a single casing having a unitary inlet and multiple outlets.

10. The recuperator as defined in claim 6 wherein multiple cores are provided with respective casings that have respective inlets and outlets.

11. A recuperator to be located in an exhaust duct of a gas turbine engine having a compressor section, a combustor section and a turbine section, with the exhaust duct downstream of the turbine section, the recuperator comprising: a casing of circular cross-section containing at least a core made up of exhaust gas channels for the passage of hot gases from the turbine section in heat exchange relationship with pre-combustion stage air, and inlet and outlet openings defined in the casing for the passage of hot gases through the exhaust gas channels in the core; the casing is defined by a thin wall interrupted by an expansion portion of the thin wall allowing the thin wall to expand or contract in response to at least one of thermal stresses and vibrations, the expansion porion including at least one of a circumferential band and corrugations in the thin all forming bellows; feeder members extending radially across the outlet opening for passing the air through the air channels of the core; header members extending radially across the inlet opening of the casing for receiving and redirecting air from the air channels in the core towards the combustor section; the feeder and header members each having an inverse tapered configuration relative to an axial center of the casing so as to maintain a relatively constant pressure over the radial extent of the respective feeder and header members.

12. The recuperator as defined in claim 11 wherein the thin wall of the casing is approximately 1 mm thick.

\* \* \* \* \*